F. A. PECK AND J. E. A. MOORE.
DRAW BAR.
APPLICATION FILED NOV. 25, 1918.

1,345,399.

Patented July 6, 1920.
3 SHEETS—SHEET 1.

INVENTORS:
FRANK A. PECK
JAMES E. A. MOORE

BY Frease, Markel and Saywell

ATTORNEYS

F. A. PECK AND J. E. A. MOORE.
DRAW BAR.
APPLICATION FILED NOV. 25, 1918.

1,345,399.

Patented July 6, 1920.
3 SHEETS—SHEET 2.

INVENTORS:
FRANK A. PECK
JAMES E. A. MOORE
BY
Frease, Merkel and Saywell
ATTORNEYS

F. A. PECK AND J. E. A. MOORE.
DRAW BAR.
APPLICATION FILED NOV. 25, 1918.

1,345,399.

Patented July 6, 1920.

3 SHEETS—SHEET 3.

INVENTORS:
FRANK A. PECK
JAMES E. A. MOORE

BY Frease, Merkel & Saywell

ATTORNEYS

UNITED STATES PATENT OFFICE.

FRANK A. PECK AND JAMES E. A. MOORE, OF CLEVELAND, OHIO.

DRAW-BAR.

1,345,399.         Specification of Letters Patent.    Patented July 6, 1920.

Application filed November 25, 1918. Serial No. 264,048.

*To all whom it may concern:*

Be it known that we, FRANK A. PECK and JAMES E. A. MOORE, citizens of the United States, and residents of Cleveland, county of Cuyahoga, and State of Ohio, have invented new and useful Improvements in Draw-Bars, of which the following is a specification, the principle of the invention being herein explained and the best mode in which we have contemplated applying that principle, so as to distinguish it from other inventions.

Our invention relates to draw-bars and particularly to a device of this character adapted to secure an agricultural implement to a tractor. The object of the invention is to design an improved connection for this purpose, and which shall also function automatically to render the tractor non-effective, when an overload is imposed upon the implement, such as the encountering of an unusual obstruction in the path of the same.

The annexed drawings and the following description set forth in detail certain means embodying our invention, the disclosed means, however, constituting but one of the various mechanical forms in which the principle of the invention may be applied.

Figure 1:
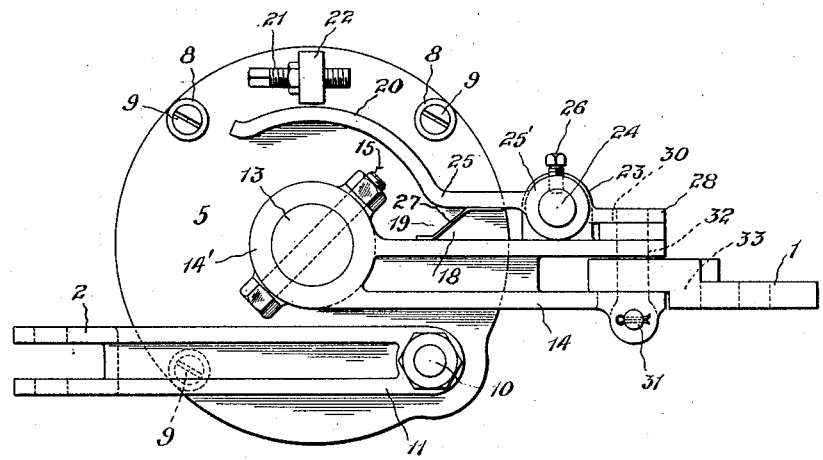
Figure 2:
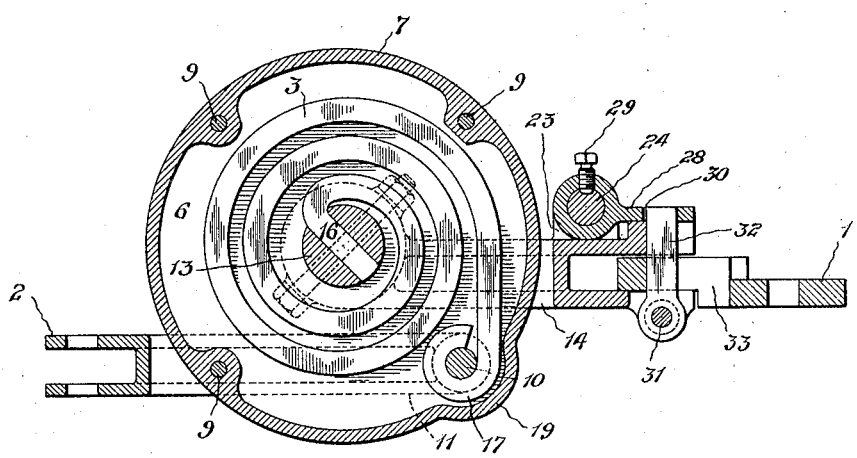
Figure 3:
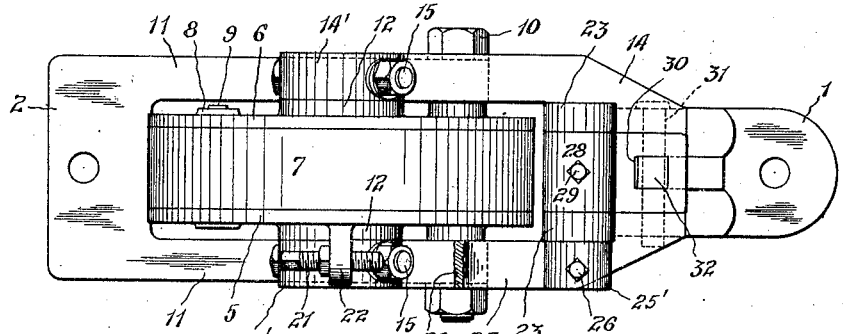
Figure 4:
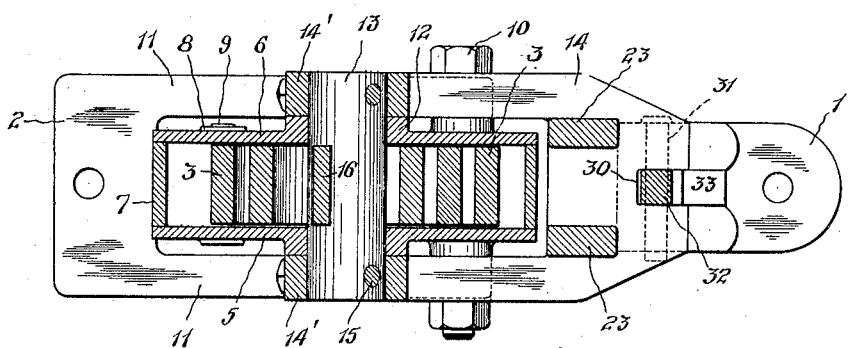
Figure 5:
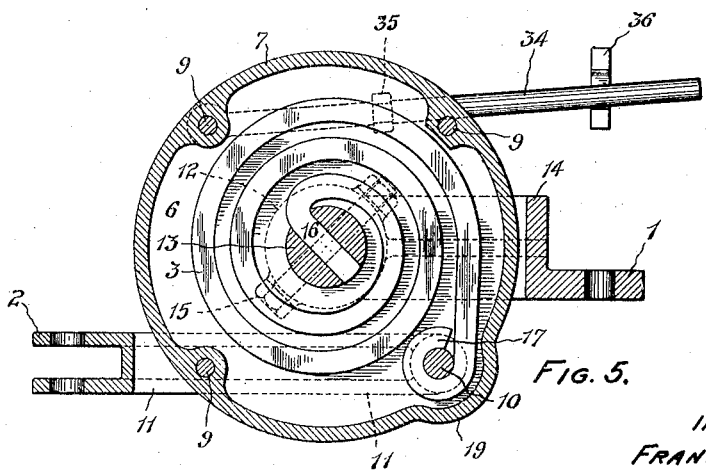
Figure 6:
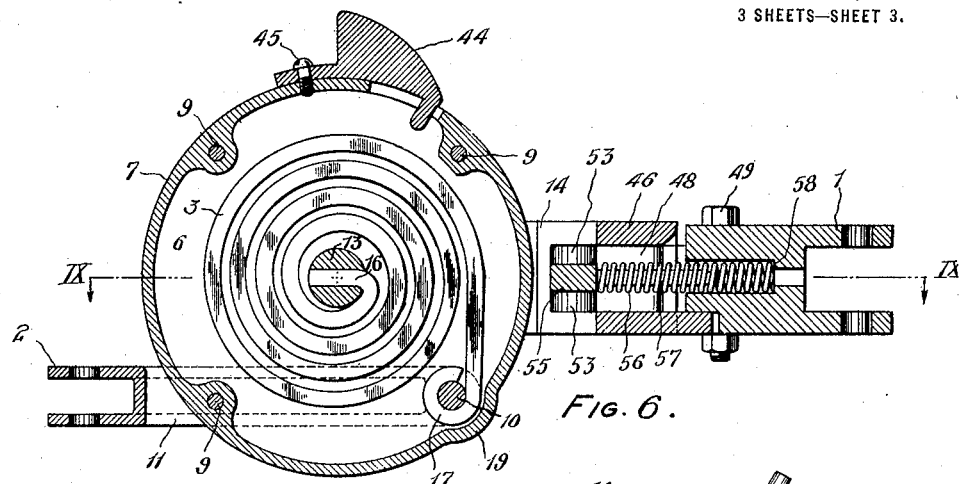
Figure 7:
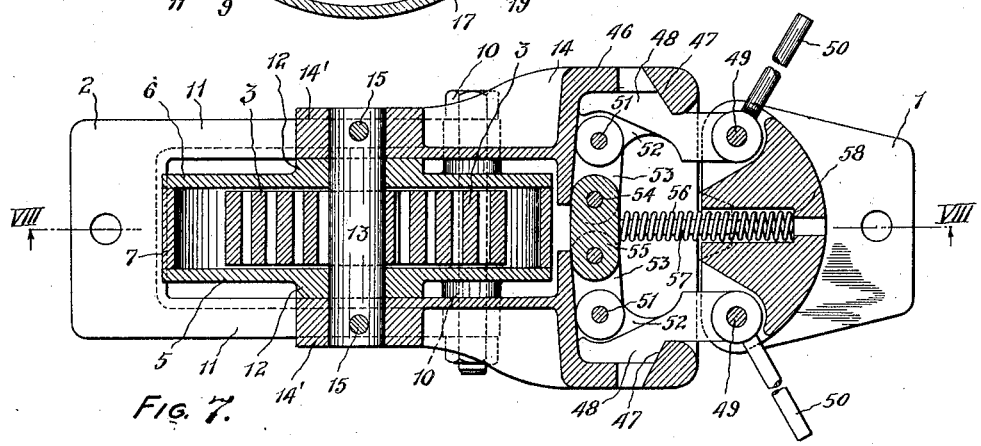
Figure 8:
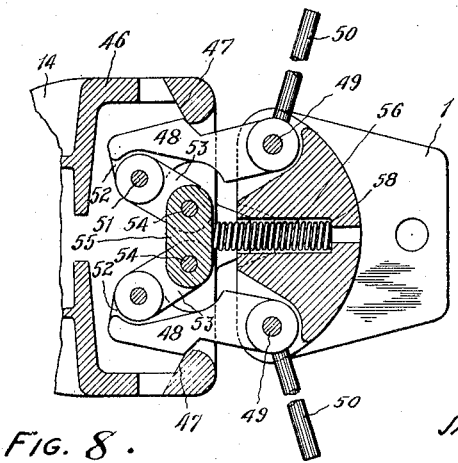

In said annexed drawings:

Figure 1 represents a side elevation of the preferred form of our improved draw-bar and automatic release; Fig. 2 represents a central longitudinal vertical section thereof; Fig. 3 represents a plan view thereof; Fig. 4 represents a longitudinal central horizontal section thereof; Fig. 5 represents a central longitudinal vertical section of a modified design, in which means for automatically rendering the tractor non-effective function in a radically different manner; Figs. 6 and 7 represent, respectively, a central vertical longitudinal section and a central horizontal longitudinal section of a further modification; and Fig. 8 represents a view of fragmentary parts shown in Fig. 7, when moved substantially to their releasing position.

Referring to the annexed drawings, tractor and implement connections are shown having the draw-heads 1 and 2, respectively. The design in effect flexibly joins together these two connections, the particular means therefor being either a torsion spring 3 of the flat coil variety, in the form of device illustrated. However, the use of other forms of torsion springs, such as the conical coil, the elongated coil, or other varieties, would come within the spirit of my invention. The spring 3, Fig. 2, is contained within a cylindrical casing comprising side plates 5 and 6 and a body plate or member 7. These plates 5, 6 and 7 are secured together by means of a plurality of machine screws 9 intersecting suitable bosses 8 formed upon the outer faces of the plates 5 and 6 and interior bosses formed upon the body member 7. An extended bolt 10 also intersects the side plates 5 and 6 and exteriorly of said plates is provided with journal portions for bearing members formed at the ends of two arms 11 comprising a yoke into which the draw-bar end of the implement connection 2 is formed. The side plates 5 and 6 are also formed with enlarged centrally disposed bosses 12 forming bearings for an axle 13 extended outwardly somewhat at both ends from said bearings 12 and secured to end members 14', 14' formed in the two yoke arms 14 into which the draw-bar end of the tractor connection 1 is formed, Fig. 4, or into which an auxiliary intermediate draw-bar member is formed, Figs. 2 and 7. Said ends 14' are rigidly secured to the axle 13 by the machine bolts 15. Referring particularly to Figs. 1 to 5 inclusive, and Figs. 6 and 7, the flat torsion spring 3 is secured at its inner end 16 to the axle 13 and at its outer end 17 to the bolt 10, enlarged bellied portions 19 of the members 5, 6 and 7 providing suitable accommodation for this purpose. It is evident that the aforedescribed design provides a flexible connection between the tractor and implement connections 1 and 2; that such flexibility will be exercised by the cylindrical casing rolling upon the axis of the bolt 10; and that said cylindrical casing will rotate an amount exactly proportioned to the flexibility of the spring utilized.

Now, it is designed to utilize this rotation of the cylindrical casing induced by the drag of the implement and opposed by the tension of the spring to cause a release mechanism automatically to function when said rotation reaches a predetermined amount. The preferred form of release is shown in Figs. 1, 2, 3 and 4. Formed upon the outer face of the plate 5 and near the periphery thereof is a lug 22 threaded to receive a screw 21, the position of the screw within the lug 22 thus being adjustable. Formed up from the yoke 14 are a pair of bearing members 23 within which is journaled a pin 24. A rearwardly extending member 25 is secured by an end portion 25' to one end of the pin 24 by a screw 26. The free rear thumb or finger end 20 of the member 25 is normally held in the position shown in Fig. 1 by means of a spring 27 mounted upon one of the arms 14. A centrally disposed forwardly projecting member 28 is also secured to said pin 24, the securing means being a screw 29, the free forward end of said member 28 being formed with a rectangular slot 30. Pivotally mounted in the lower forward portion of the arms 14 is a pin 31 to which is secured a central upwardly projecting post 32 rectangular in cross-section and adapted to intersect the slot 30. The rearward portion of the drawhead 1 is formed with an enlarged slot 33 through which extends the post 32. The member 25 is disposed in the path of movement of the screw 21 as the same rotates with the cylindrical casing. It is evident, therefore, from the foregoing description that when the cylindrical casing is rotated an amount sufficient to cause the pin 21 to bear upon the free end of the member 25, the latter, against the action of the spring 27, will be depressed, resulting in the rotation of the pin 24, and the consequent upward movement of the free end of the member 28 which will release the post 32 and cause the same, under the influence of the pull of the connection 1, to fall forwardly and release the tractor connection from the draw-bar. The amount of movement of the pin 21 necessary to effect this result can be varied, as shown, and such amount of rotation is calculated, of course, according to the stress that it is desired to put upon the spring 3.

In the construction shown in Fig. 5, the design for rendering the tractor non-effective is radically different. Said design, however, depends for this function upon the rotation of the cylindrical casing. In this design, a rod 34 is secured at one end to one of the machine screws 9 and is provided with an adjustable nut 35. Said rod 34 intersects a lever 36 whose actuation is designed to control the clutch or brake. It is evident that the rotation of the cylindrical casing a sufficient amount will result in the movement of the lever 36 through the contact therewith of the nut 35 and that said lever will throw out the clutch or apply the brake of the tractor as desired. The amount of necessary movement of the cylindrical casing can again be varied because of the possible adjustment of the position of the nut 35 upon the rod 34.

In the form of device shown in Figs. 6, 7 and 8, the flat torsion spring is utilized but the design of automatic release and the elements upon which the same acts are different. As plainly shown in Fig. 6, the release takes the form of a member 44 secured to the body member 7 of the cylindrical casing by a screw 45 and having an exterior cam surface. This surface is adapted to effect the release of certain jaws through the action of certain toggle links, hereinafter more fully described, when the cylindrical casing has rotated an amount determined upon as a maximum before the tractor should be rendered noneffective. In this form of construction the forward ends 46 of the arms 14 are formed with beveled jaw guides 47. A pair of jaws 48 are formed with surfaces adapted to coöperate with these guides 47 and are pivoted upon bolts 49 vertically extended through and upon both sides of the tractor connection 1. These bolts 49 may be actuated by steel rods 50 secured thereto. Two pairs of toggle links 53 are pivoted at their respective ends to the upper and lower portions of two pairs of bolts 51 and 54, the outer ends of the links being pivoted to the bolts 51 and the inner ends of the links being pivoted to the bolts 54, all as plainly shown in Figs. 7 and 8. Said bolts 51 are secured within inwardly projecting portions 52 of the jaws 48. Bolts 54 intersect a centrally disposed toggle guide 55. Said toggle guide 55 and the tractor connection 1 are normally spaced a maximum distance apart through the tension of a coil spring 56 surrounding a pin 57 forwardly extended from said guide 55 and abutting against a shoulder 58 formed in the drawhead 1. It is evident from the foregoing description that a sufficient rotation of the cylindrical casing will cause the cam surface 44 to bear upon the toggle guide 55, gradually forcing said guide forwardly and ultimately resulting in the pulling together of the jaws 48 and the freeing of the same from the beveled surfaces 47. Then the pull of the tractor will result in the freeing of the draw-head 1 and the associated parts, plainly shown in Fig. 8, from the members 46. When it is desired to reconnect the parts, the jaws 48 and associated mechanisms are sufficiently manually actuated through the medium of the steel rods 50 to allow of the entrance of the jaws 48 within the space defined by the inner edges of the beveled guides 47 and the rods 50 then released.

What we claim is:

1. A draw-bar comprising, an element adapted for attachment to a tractor; an element adapted for attachment to an implement; a torsion spring secured at its ends relatively to said elements, respectively; and a trip adapted to be moved proportionately to the stress imposed upon said spring, a predetermined movement of said trip being adapted to render the tractor non-effective.

2. A draw-bar comprising, an element adapted for attachment to a tractor; an element adapted for attachment to an implement; a torsion spring secured at its ends relatively to said elements, respectively; and a member pivoted relatively to said elements and adapted to be rotated an amount proportioned to the stress imposed upon said spring, a predetermined rotation of said member being adapted to render the tractor non-effective.

3. A draw-bar comprising, an element adapted for attachment to a tractor; an element adapted for attachment to an implement; an axle secured to said first-mentioned element; a member pivotally secured relatively to said axle and to said second-mentioned element; a torsion spring secured to said axle and said member; and movable means disposed in the path of potential relative movement of said elements, a predetermined movement of said means being adapted to render the tractor non-effective.

4. A draw-bar comprising, an element adapted for attachment to a tractor; an element adapted for attachment to an implement; an axle secured to said first-mentioned element; a member rotatably mounted upon said axle and pivotally secured to said second-mentioned element; a torsion spring secured to said axle and said member; and movable means disposed in the path of potential relative movement of said elements, a predetermined movement of said means being adapted to render the tractor non-effective.

5. A draw-bar comprising, a pair of coupling heads; an axle; a member pivotally secured relatively to said axle and to one of said heads; a torsion spring whose ends are, respectively, connected to said axle and said member; means secured to said axle and detachably connected to said other coupling head; and means actuated by the movement of said member to disconnect said aforementioned means from said coupling head.

6. A draw-bar comprising, a pair of coupling heads; an axle; a casing rotatably mounted upon said axle and pivotally secured to one of said heads; a torsion spring contained within said casing and whose ends are, respectively, connected to said axle and said casing; means secured to said axle and detachably connected to said other coupling head; and means actuated by the rotation of said casing to disconnect said aforementioned means from said coupling head.

7. A draw-bar comprising, a pair of coupling heads; an axle; a casing rotatably mounted upon said axle and pivotally secured to one of said heads; a torsion spring contained within said casing and whose ends are, respectively, connected to said axle and said casing; means secured to said axle and detachably connected to said other coupling head; and adjustable means actuated by the rotation of said casing to disconnect said aforementioned means from said coupling head.

8. A draw-bar comprising, a pair of coupling heads; an axle; a casing rotatably mounted upon said axle and pivotally secured to one of said heads; a torsion spring contained within said casing and whose ends are, respectively, connected to said axle and said casing; means secured to said axle and detachably connected to said other coupling head; and a trip adjustably secured to said casing and adapted, upon the rotation of the latter, to engage said aforementioned means to disconnect the same from said coupling head.

9. A draw-bar comprising, a pair of coupling heads; an axle; a casing rotatably mounted upon said axle and pivotally secured to one of said heads; a torsion spring contained within said casing and whose ends are, respectively, connected to said axle and said casing; a draft-bar secured to said axle; a pin journaled in said draft-bar; a rock arm secured to said pin; a latch secured to a second pin journaled in said draft-bar, said latch intersecting the other coupling head and one end of said rock arm; means normally holding said rock arm in engaged position with said latch; and an adjustable trip secured to said rotatable casing and adapted to engage the other end of said rock arm, upon the rotation of said casing.

10. A draw-bar comprising, a pair of coupling heads; a cylindrical casing comprising a pair of cover plates and a contained body member; an axle upon which said casing is rotatably mounted; a flat coil spring whose ends are respectively secured to said axle and said cover plates, said casing being pivotally mounted relatively to one of said coupling heads; means secured to said axle and detachably connected to said other coupling head; and means actuated by the rotation of said casing to disconnect said aforementioned means from said coupling head.

11. A draw-bar comprising, a pair of coupling heads; a cylindrical casing comprising a pair of cover plates and a contained body member; an axle upon which said casing is rotatably mounted; a flat coil spring whose ends are respectively secured to said axle and said cover plates, one end of one of said coupling heads being yoke-shaped; a pin intersecting the arms of said yoke and journaled therein, said casing being disposed between said arms, said pin intersecting and being journaled in said casing; means secured to said axle and detachably connected to said other coupling head; and means actuated by the rotation of said casing to disconnect said aforementioned means from said coupling head.

Signed by us, this 8th day of November, 1918.

FRANK A. PECK.
JAMES E. A. MOORE.